UNITED STATES PATENT OFFICE.

RICCARDO ARNO AND LUIGI NEGRO, OF TURIN, ITALY.

TROLLEY-CAR FOR ELECTRIC MOTOR-VEHICLES.

No. 894,931.     Specification of Letters Patent.     Patented Aug. 4, 1908.

Application filed June 14, 1906. Serial No. 321,699.

*To all whom it may concern:*

Be it known that we, RICCARDO ARNO, C. E., and LUIGI NEGRO, C. E., both subjects of the King of Italy, residing at Turin, Italy, have invented new and useful Improvements in Trolley-Cars for Electric Motor-Vehicles, of which the following is a specification.

The object of the present invention is to provide an improved trolley car for supplying current to electric motor vehicles, designed for use without rails, in which the operation of the car is rendered wholly independent of the operation of the motor of the said vehicle by the interposition of an electro-magnetic transmission device between driving shaft and motor.

Figure 1:
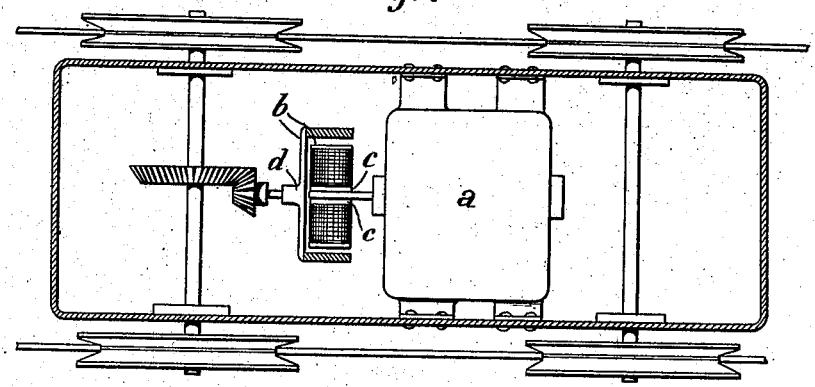
Figure 2:
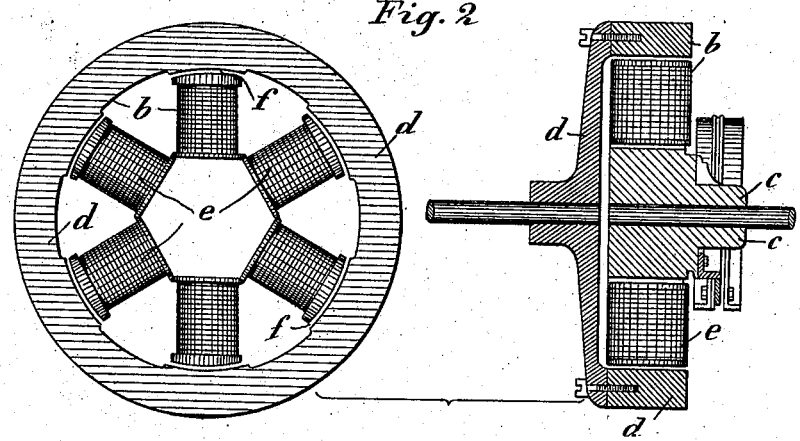
Figure 3:
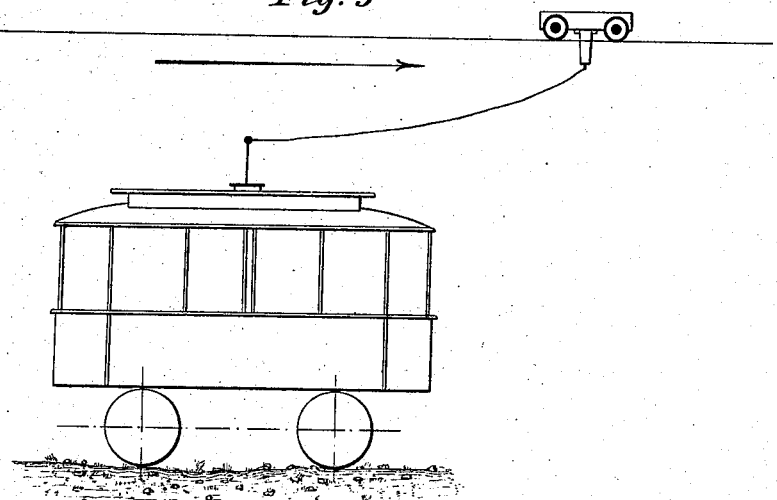

In the annexed drawing illustrating the said invention, in which like reference characters designate like parts, Figure 1 is a plan view of the improved trolley-car, Fig. 2 is a plan view and side elevation of the electro-magnetic transmission device, and Fig. 3 shows an electric motor vehicle provided with the said improved trolley-car, the vehicle being propelled by current drawn from the trolley-car.

The current operating in the small motor of existing trolley-cars is not only strictly connected with the operation of the motors of the motor-vehicle, but in order to have a regular operation of the whole system, it is necessary that the distribution current on the working line be a direct current.

It is important to keep in mind that while the trolley-car runs nearly always on a line parallel to the longitudinal axis of the road, the motor-vehicle, owing to the necessities of street life, nearly always describes zigzag lines, thus the trolley motor, which depends, not upon the speed of the motor-vehicle, but upon the speed of the motor, will be subjected to heavy overloads, and the leading cable will be subjected to excessive tensions by reason of unequal speeds of the trolley and motor vehicle.

In the system which forms the subject matter of the present invention, the operation of the auxiliary or trolley motor —$a$—, is rendered independent of the motor vehicle by the interposition, between the driving shaft and the motor, of electro-magnetic transmission device —$b$—, which comprises two main parts, of which the part —$c$—, which may be termed the "leading" element, is directly connected to the motor, and the part —$d$—, which may be termed the element "lead", is suitably connected to the driving wheels.

The "leading" part —$c$— comprises a series of magnets or electro-magnets —$e$—, while the part "lead" comprises a ring —$d$— of preferably laminated magnetic material having as many polar faces —$f$— as there are poles in the first part, these two parts being arranged on alined axes, and so that the magnetic flux developed by the magnets or electro-magnets —$e$— of the "leading" part acts on corresponding polar faces of the ring —$d$—.

In this system the motor is connected to the driving wheels by a magnetic flux which transmits to the trolley-car a certain power, and which provides for wide variations in speed.

The action of the improved transmission device is due to a torque formed between the two parts thereof each time one of them is rotated, and the determining causes of this torque, if the ring is solid, are evidently of two orders, viz: First—magnetic effects due to the existence of a tangential component of the magnetic attraction, second—electro-magnetic effects due to the presence of induced currents in the ring —$d$—. If, however, the ring is laminated, the torque is due to the former of the two phenomena. In the present invention either or both of these effects may be considered.

It will be understood that in our system, if the resultant of all the tangential components of the magnetic effects above referred to, is such as to equal or correspond to a certain tension of the rope or cable connecting the trolley-car to the motor vehicle, it will follow that whatever may be the distance traveled by the motor vehicle and whatever may be the speed, the trolley-car will always be in advance of the motor-vehicle, keeping a constant distance from the latter, and the rope or cable above mentioned will be under some degree of tension dependent upon the direction of movement and speed of the car. In case the motor-vehicle stops, the rope or cable will be tightened more and more so that the two parts of the transmission device will begin to slide, with relation to each other, without thereby overloading the small motor of the trolley-car. In fact, in this appliance the torque between the part —$c$— and the ring —$d$— being constant, it follows that the tangential component of the mag-netic effects before mentioned, is also constant within certain limits. The speed at which the trolley-car is allowed to move depends upon the resistance of the leading cable or rope connecting the trolley-car to the motor-vehicle. This tension decreases as the speed of the motor-vehicle increases and vice versa, and at a high speed of the trolley motor-cars the sliding action between the two parts of the transmission device will be small. On the other hand, when the motor-car stops, the trolley-car will be stopped and the two parts of the transmission device will reach the maximum rate of relative movement or sliding with relation to each other.

Having now fully described our invention, we claim:

1. In an invention of the character described, a trolley-car adapted to supply current from a suitable trolley to an electrically propelled vehicle, a motor for actuating the driving wheels of said car and means interposed between said motor and driving wheels adapted to permit the operation of the motor, without moving said driving wheels when the car is held against forward movement.

2. In an invention of the character described, a trolley-car adapted to supply current from a suitable trolley to an electrically propelled vehicle, a motor for actuating the driving wheels of said car and a magnetic transmission device interposed between said motor and driving wheels, said device permitting the motor to operate without moving said driving wheels when the car is held against forward movement, substantially as described.

In testimony whereof we have affixed our signatures in presence of two witnesses.

RICCARDO ARNO.
LUIGI NEGRO.

Witnesses:
 HUGO PIZZOTTI,
 GUTTARDO C. PICONI.